United States Patent
Connor et al.

(10) Patent No.: US 7,065,598 B2
(45) Date of Patent: Jun. 20, 2006

(54) METHOD, SYSTEM, AND ARTICLE OF MANUFACTURE FOR ADJUSTING INTERRUPT LEVELS

(75) Inventors: Patrick L. Connor, Portland, OR (US); Eric K. Mann, Hillsboro, OR (US); Hieu T. Tran, Portland, OR (US); Priya Govindarajan, Hillsboro, OR (US); John P. Jacobs, Beaverton, OR (US); David M. Durham, Hillsboro, OR (US); Gary D. Gumanow, Portland, OR (US); Chun Yang Chiu, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 365 days.

(21) Appl. No.: 10/326,740

(22) Filed: Dec. 20, 2002

(65) Prior Publication Data

US 2004/0123008 A1 Jun. 24, 2004

(51) Int. Cl.
*G06F 13/24* (2006.01)

(52) U.S. Cl. ............... 710/260; 710/266; 710/261; 370/463

(58) Field of Classification Search ........ 710/260–266, 710/100; 370/463
See application file for complete search history.

(56) References Cited

U.S. PATENT DOCUMENTS

| | | | | |
|---|---|---|---|---|
| 5,414,858 A | * | 5/1995 | Hoffman et al. | 710/48 |
| 6,065,089 A | * | 5/2000 | Hickerson et al. | 710/266 |
| 2003/0200368 A1 | * | 10/2003 | Musumeci | 710/260 |

OTHER PUBLICATIONS

10 Gigabit Ethernet Alliance, "10 Gigabit Ethernet Technology Overview White Paper", Revision 2, Draft A, Apr. 2002, pp. 1–16.
U.S. Appl. No. 10/313,380, filed Dec. 6, 2002, entitled "Method, System, and Article of Manufacture for Increasing Network Throughput", invented by P. L. Connor & E. K. Mann.

* cited by examiner

*Primary Examiner*—Rehana Perveen
*Assistant Examiner*—Kim T. Huynh
(74) *Attorney, Agent, or Firm*—Rabin Dranath Dutta; Konrad Raynes & Victor LLP

(57) ABSTRACT

Provided are a method, system and article of manufacture for adjusting interrupt levels. A current system interrupt rate at a computational device is determined, wherein the current system interrupt rate is a sum of interrupt rates from a plurality of interrupt generating agents. The current system interrupt rate is compared with at least one threshold interrupt rate associated with the computational device. Based on the comparison, an interrupt moderation level is adjusted at an interrupt generating agent of the plurality of interrupt generating agents.

32 Claims, 4 Drawing Sheets

METHOD, SYSTEM, AND ARTICLE OF MANUFACTURE FOR ADJUSTING INTERRUPT LEVELS

BACKGROUND OF THE INVENTION

1. Field of the Invention

The present invention relates to a method, system, and an article of manufacture for adjusting interrupt levels.

2. Description of the Related Art

A computational device, such as a host system, may include a plurality of interrupt generating agents, such as Input/Output (I/O) controllers. Many I/O controllers are capable of receiving tens or hundreds of thousands of packets (e.g., frames, cells, etc.) per second. I/O controllers, including high-speed I/O controllers (e.g. Gigabit Ethernet MACs), may use interrupts as a method to indicate an I/O event, such as the arrival of a packet. An interrupt service routine associated with a device driver corresponding to the I/O controller may process the I/O events. The processing may include indicating the arrived packet to a protocol stack and the thereby an application that needs the data included in the packet.

Frequent interrupts may reduce the system performance of the computational device. A high rate of interrupt can increase CPU utilization. As a result, the system may become CPU limited and unable to service the received packets. Furthermore, the amount of processing time available to other parts of the protocol stack, operating system, applications, etc., may be reduced. There may be delays in sending acknowledgments or subsequent packets may be dropped. The overall system throughput and reliability of the system may be reduced and livelock may occur. Livelock refers to a state where the processor bandwidth is completely consumed by interrupt processing and other functions are starved.

When the level of interrupts in a system impacts system performance the level of interrupts from interrupt generating agents may have to be adjusted. Prior art techniques include polling, which do not use interrupts, to limit interrupt levels in a system. Prior art I/O controllers may also use a single interrupt to indicate the occurrence of several interrupt events, such as 10 packets being received, to reduce the number of interrupts. However, notwithstanding the earlier techniques for adjusting interrupt levels, there is a need in the art for improved implementations for adjusting interrupt levels.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments. It is understood that other embodiments may be utilized and structural and operational changes may be made without departing from the scope of the present embodiments.

A high level of interrupts to a system may degrade system performance. In embodiments of the invention, an application monitors the overall level of interrupts to the system and adjusts the interrupt moderation level of interrupt generating agents, such as I/O controllers, that are coupled to the system. By adjusting the interrupt moderation level of the interrupt generating agents the interrupt rate from the interrupt generating agents to the system can be controlled. For example, if the overall level of interrupts is too high then the interrupt moderation level may be increased and if the overall level of interrupt is too low then the interrupt moderation level may be decreased.

Figure 1:
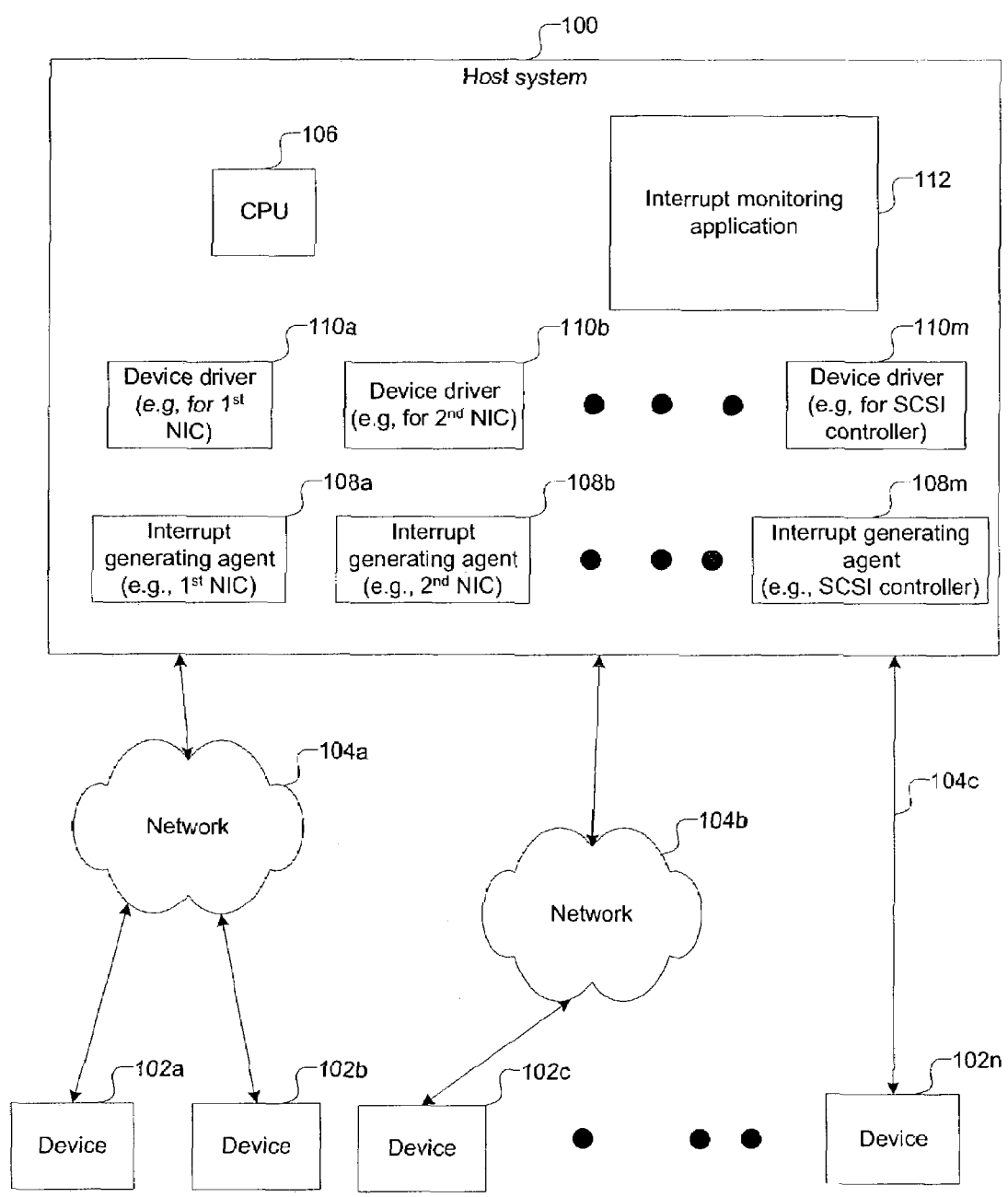
FIG. 1 illustrates a block diagram of a computing environment, in accordance with certain described embodiments of the invention.

FIG. 1 illustrates a block diagram of a computing environment, in accordance with certain described aspects of the invention. A host system 100 is connected to a plurality of devices 102a . . . 102n. The connections of the host system 100 to the plurality of devices 102a . . . 102n may be over one or more networks 104a, 104b or be over a direct connection 104c.

The host system 100 may be any computational device known in the art, such as a personal computer, a workstation, a server, a mainframe, a hand held computer, a palm top computer, a laptop computer, a network switch or router, a telephony device, a network appliance, a wireless device, etc. The devices 102a . . . 102n may include any device known in the art, including storage devices, monitors, printers, scanners, etc. In certain embodiments the devices 102a . . . 102n may also include computational devices known in the art.

The networks 104a 104b may be any network known in the art, such as the Internet, an intranet, a Local area network (LAN), a Storage area network (SAN), network attached storage (NAS), a Wide area network (WAN), a wireless network (wi-fi), etc. In certain embodiments, the networks 104a, 104b are high speed network, such as, Gigabit Ethernet networks. In certain embodiments, the host system 100 may be connected to the devices 102a . . . 102n without a network, such as, through direct lines, common bus systems, etc., in a manner known in the art. Also the networks 104a, 104b may be part of one or more larger networks or may be an independent network or may be comprised of multiple interconnected networks. While in the described embodiments, the devices 102a . . . 102n and the host system 100 communicate within a client-server paradigm, the devices 102a . . . 102n and the host system 100 may also communicate within a peer-to-peer or other paradigm known in the art.

The host system 100 includes at least one central processing unit 106, and has one or more interrupt generating agents 108a . . . 108m coupled to the host system 100. The interrupt generating agents 108a . . . 108n include timers, codec and cryptographic devices, and I/O devices such as keyboards, mice, disk controllers, serial and parallel ports to printers, scanners, network controllers, modems, and display devices. In alternative embodiments one or more interrupt generating agents 108a . . . 108m may be located on the devices 102a . . . 102n rather than in the host system 100. In addition to generating interrupts, the interrupt generating agents 108a ... 108m may establish and maintain the connections between the host system 100 and the devices 102a ... 102n. Each interrupt generating agent 108a ... 108m may correspond to one or more devices 102a ... 102n connected to the host system 100. For example, interrupt generating agent 108a and 108b are Network Interface cards (NIC), i.e., network adapters, and interrupt generating agent 108m is a Small-Computer System Interface (SCSI) controller. In one embodiment, interrupt generating agent 108a may connect to the network 104a, interrupt generating agent 108b may connect to the network 104b, and the interrupt generating agent 108m may connect to a SCSI storage device among the devices 102a ... 102n. The interrupt generating agents 108a ... 108m receive and transmit packets between the host 100 and the devices 102a ... 102n.

The host system 100 also has one or more device drivers 110a ... 110m corresponding to the interrupt generating agents 108a ... 108m. In certain embodiments, a single device driver may correspond to multiple interrupt generating agents. The device drivers 110a ... 110m act as interfaces between the interrupt generating agents 108a ... 108m and the operating system (not shown) of the host system 100.

An interrupt monitoring application 112 implementing an embodiment of the invention is coupled to the host system 100. The interrupt monitoring application 112 may be written in any programming language known in the art and may be part of other applications. The interrupt monitoring application 112 monitors the level of interrupts to the host system 100 from the interrupt generating agents 108a ... 108m.

In many situations, the devices 102a ... 102n cause a high level of interrupts, i.e., a high interrupt rate, to be generated by the corresponding interrupt generating agents 108a ... 108n. The CPU 106 may be overloaded as a result of the high level of interrupts. The interrupt monitoring application 112 monitors the rate of interrupts to the host system 100 and adjusts the rate of interrupts to the host system 100.

For example, the performance of host system 100 may be impacted adversely when the interrupt rate exceeds 20,000 interrupts per second and livelock may occur at 40,000 interrupts per second. If at a particular instant of time, the interrupt generating agents 108a, 108b, and 108m have interrupt rates per second of 9000, 8000, and 4000 respectively, then the overall interrupt rate is 21,000 interrupts per second and the performance of the host system 100 begins to suffer as the interrupt rate exceeds 20,000 interrupts per second. Livelock may occur in the host system 100 if interrupts exceed 40,000 interrupts per second. If interrupt moderation schemes of the interrupt generating agents 108a, 108b, and 108c limit the maximum interrupt rate of the interrupt generating agents 108a, 108b, 108c, to 15,000 interrupts per second, 25,000 interrupts per second, and 6000 interrupts per second respectively, then the peak interrupt rate at the host system 100 may become as much as 46,000 interrupts per second and cause a livelock because the peak interrupt rate exceeds 40,000 interrupts per second. The interrupt monitoring application 112 adjusts the interrupt rate of the interrupt generating agents 108a ... 108m to increase the performance of the host system and also prevent livelocks. Therefore, the interrupt monitoring application increases the throughput of packets processed at the host system 100.

Figure 2:
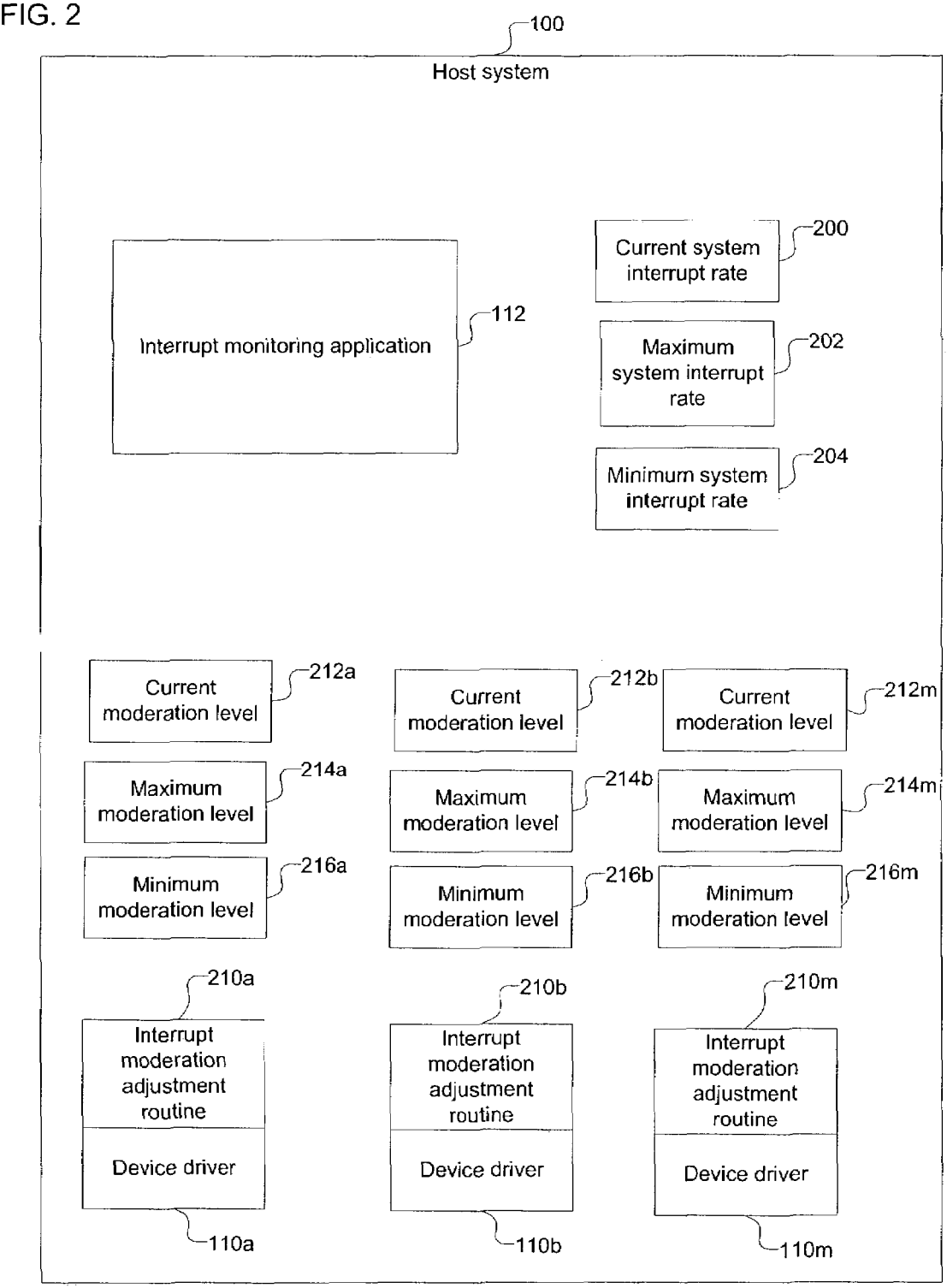
FIG. 2 illustrates a block diagram of data structures and applications, in accordance with certain described embodiments of the invention.

FIG. 2 illustrates a block diagram of host system 100 including the interrupt monitoring application 112 and other applications and data structures, in accordance with certain described embodiments of the invention. Coupled to the host system 100 and the interrupt monitoring application 112, is a current system interrupt rate 200, a maximum system interrupt rate 202 and a minimum system interrupt rate 204. The current system interrupt rate 200, the maximum system interrupt rate 202, and the minimum system interrupt rate 204 may be implemented in any data structure known in the art including a variable, a record, a field, a pointer, etc.

The current system interrupt rate 200 is the total number of interrupts per second generated by all the interrupt generating agents 108a ... 108m at a particular instant of time. The total number of interrupts per second generated by all the interrupt generating agents is also referred to as the system interrupt rate. The maximum system interrupt rate 202 is the maximum value of the system interrupt rate at which the host system 100 can run effectively. The maximum system interrupt rate 202 cannot exceed the system interrupt rate at which livelock can occur in the host system 100. The minimum system interrupt rate 204 is the minimum value of the system interrupt rate below which no increase in performance of the host system 100 is likely by reducing the system interrupt rate any further.

Associated with the device drivers 110a ... 110m are corresponding interrupt moderation adjustment routines 210a ... 210m respectively for the interrupt generating agents 108a ... 108m. For example, interrupt moderation adjustment routine 210a associated with the device driver 110a may be used to adjust the interrupt level for interrupt generating agent 108a.

Corresponding to the interrupt generating agents 108a ... 108m the host system 100 has current moderation levels 212a ... 212m, maximum moderation levels 214a ... 214m and minimum moderation levels 216a ... 216m. The current moderation levels 212a ... 212m, the maximum moderation levels 214a ... 214m, and the minimum moderation levels 216a ... 216m may be implemented in any data structure known in the art including a variable, a record, a field, a pointer, etc. For example, the current moderation level 212a, the maximum moderation level 214a, and the minimum moderation level 216a may be used for moderating the interrupt level for interrupt generating agent 108a via the interrupt moderation adjustment routine 210a.

The current moderation level 212a for the interrupt generating agent 108a is the extent which interrupt levels are being moderated for the interrupt generating agent 108a at a particular instant of time. The maximum moderation level 214a for the interrupt generating agent 108a is the maximum value of the moderation level for the interrupt generating agent 108a. The minimum moderation level 216a for the interrupt generating agent 108a is the minimum value of the moderation level for the interrupt generating agent 108a. For example, the maximum moderation level 214a for the interrupt generating agent 108a may be 1 and may correspond to 10,000 interrupts per second and the minimum moderation level 216a may be 0 and correspond to 3000 interrupts per second. In such a case the current moderation level 212a of the interrupt generating agent 108a may vary between 0 and 1. If the current moderation level 212a of the interrupt generating agent 108a is 0.5 that may correspond to 6500 interrupts per second for the interrupt generating agent 108a. The moderation levels may be represented in any manner known in the art and may be represented as relative values as indicated or may be represented as absolute values, such as, the number of interrupts per second. In embodiments of the invention, there may be a different current moderation levels 212a ... 212m, maximum moderation levels 214a ... 214m and minimum moderation levels 216a ... 212m for each of the interrupt generating agents 108a ... 108m.

Figure 3:
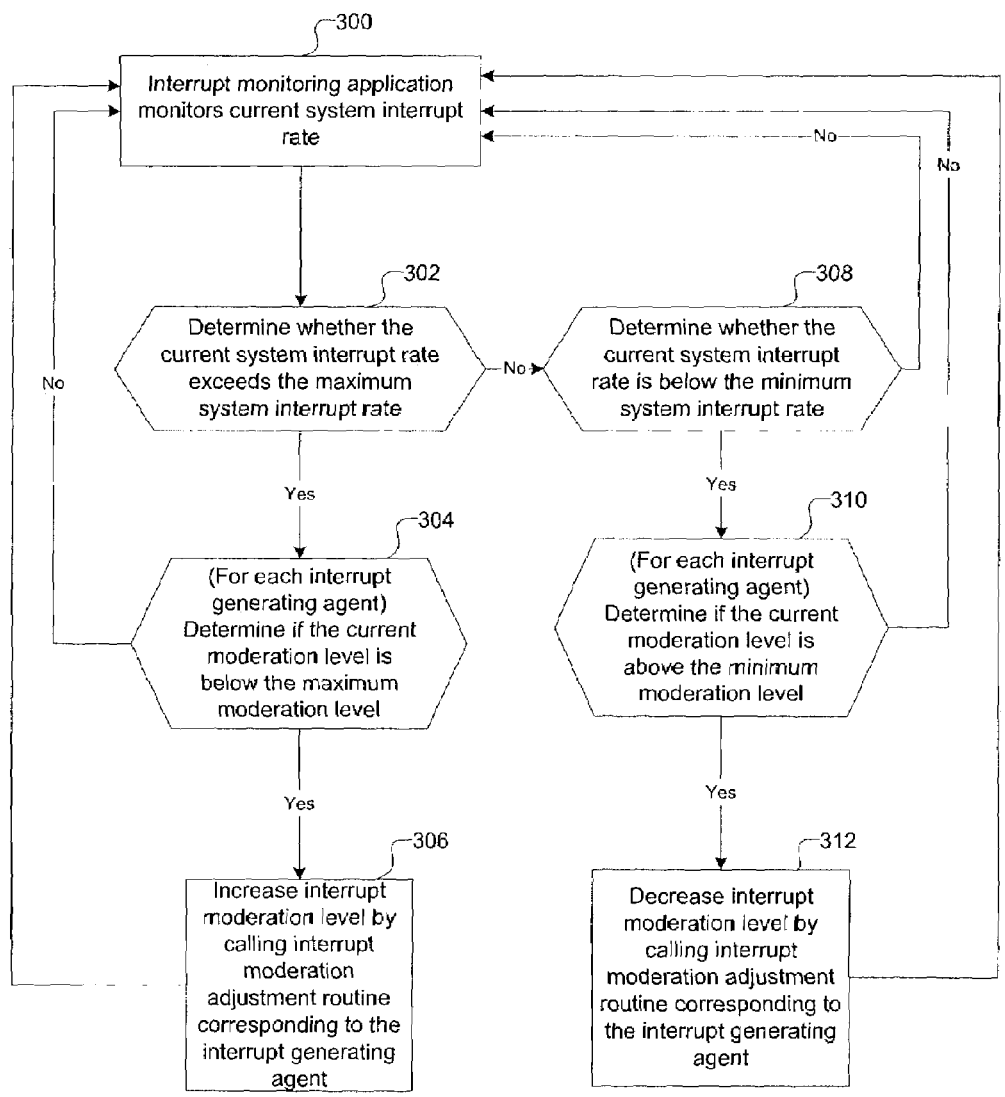
FIG. 3 illustrates logic for adjusting interrupts, in accordance with certain described embodiments of the invention.

FIG. 3 illustrates logic for adjusting interrupts, in accordance with certain embodiments of the invention. The logic may be implemented in the interrupt monitoring application 112.

The process starts at block 300, where the interrupt monitoring application 112 monitors the current system interrupt rate 200. The current system interrupt rate 200 is the total number interrupts per second generated by all the interrupt generating agents 108a . . . 108n for the host system 100. Control proceeds to block 302 where the interrupt monitoring application 112 determines whether the current system interrupt rate 200 exceeds the maximum system interrupt rate 202. If so, control proceeds to block 304 where the interrupt monitoring application 112 determines for each interrupt generating agent 108a . . . 108m whether the corresponding current moderation level 212a . . . 212m is below the corresponding maximum moderation level 214a . . . 214m. For those interrupt generating agents 108a . . . 108m whose current moderation level 212a . . . 212m is below the corresponding maximum moderation level 214a . . . 214m control proceeds to block 306 where the interrupt monitoring application 112 increases the interrupt moderation level by calling the corresponding interrupt moderation adjustment routine 210a . . . 210m. Control returns to block 300.

At block 304, for those interrupt generating agents 108a . . . 108m for which the interrupt monitoring routine determines that the corresponding current moderation level 212a . . . 212m is not below the corresponding maximum moderation level 214a . . . 214m control returns to block 300 because the current moderation level 212a . . . 212m cannot be increased any further.

If at block 302, the interrupt monitoring application 112 determines that the current system interrupt rate 200 does not exceed the maximum system interrupt rate 204 control proceeds to block 308. At block 308, the interrupt monitoring application 112 determines whether the current system interrupt rate 200 is below the minimum system interrupt rate 204. If so, control proceeds to block 310 and if not, control returns to block 300.

At block 310, the interrupt monitoring routine determines for each interrupt generating agent 108a . . . 108m whether the corresponding current moderation level 212a . . . 212m is above the corresponding minimum moderation level 216a . . . 216m. For those interrupt generating agents 108a . . . 108m whose current moderation level 212a . . . 212m is above the corresponding minimum moderation level 212a . . . 212m control proceeds to block 312 where the interrupt monitoring application 112 decreases the interrupt moderation level by calling the corresponding interrupt moderation adjustment routine 210a . . . 210m. Control returns to block 300.

At block 310, for those interrupt generating agents 108a . . . 108m for which the interrupt monitoring routine determines that the corresponding current moderation level 212a . . . 212n is not above the corresponding minimum moderation level 216a . . . 216m control returns to block 300.

The logic of FIG. 3 attempts to restrict the current moderation level 212a . . . 212m to remain between the minimum moderation level 216a . . . 216m and the maximum moderation level 214a . . . 214m for the interrupt generating agents 108a . . . 108m. The logic may adjust the interrupt moderation level of different interrupt generating agents differently. In certain embodiments of the invention, the bursty nature of interrupts arriving at the host system 100 may cause only one or two monitoring periods before the interrupt moderation level is increased, but may take many more monitoring periods before the interruption moderation level is relaxed.

The logic described in FIG. 3 may be modified such that the interrupt monitoring application 112 also considers the load on each processor in a multiple processor system and adjusts the moderation level of a device based on the affinity of the device to the processor. For example, the interrupt monitoring application 112 may increase the interrupt moderation level of an interrupt generating agent whose interrupts are overloading a particular processor.

The embodiments, implement an interrupt monitoring application that monitors the overall system interrupt level generated by a plurality of interrupt generating agents and adjusts the interrupt moderation level on at least one interrupt generating agent in the system. The embodiments improves the throughput and performance of a host system that receives interrupts. Furthermore, the embodiments do not delay interrupts when additional moderation is unnecessary.

ADDITIONAL EMBODIMENT DETAILS

The described techniques may be implemented as a method, apparatus or article of manufacture using standard programming and/or engineering techniques to produce software, firmware, micro-code, hardware or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium, such as hard disk drives, floppy disks, tape), optical storage (e.g., CD-ROMs, DVD-ROMs, optical disks, etc.), volatile and non-volatile memory devices (e.g., EEPROMs, ROMs, PROMs, RAMs, DRAMs, SRAMs, flash, firmware, programmable logic, etc.). Code in the computer readable medium is accessed and executed by a processor. The code in which embodiments are made may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the embodiments, and that the article of manufacture may comprise any information bearing medium known in the art.

Embodiments of the invention are used to improve performance by adjusting the interrupt rate. Performance can be measured in many ways such as throughput (bits per second, transactions completed per unit of time, etc.) or operations per second. There are several benchmarks for measuring performance, such as, Specint, SpecFP, Dhrystone, Khornerstone, Nhfsstone, ttcp, IOBENCH, IOZONE, Byte, Netperf, Nettest, CPU2, Hartstone, EuroBen, PC Bench/WinBench/NetBench, Sim, Fhourstones, Heapsort, Hanoi, Flops, C LINPACK, TFFTDP, Matrix Multiply (MM), Digital Review, Nullstone, Rendermark, Bench++, etc. For example, the Transaction Processing Performance Council TPC-C online transaction processing benchmark reports the throughput of specific mix of transactions, with the requirement that transactions must be completed within fixed time limits, as "tpmC". A second metric "price/tpmC" reports the total cost of the system per transaction. SPEC publishes several benchmarks. SPEC stands for "Standard Performance Evaluation Corporation", a non-profit organization with the goal to establish, maintain and endorse a standardized set of relevant benchmarks that can be applied to the newest generation of high-performance computers.

Figure 4:
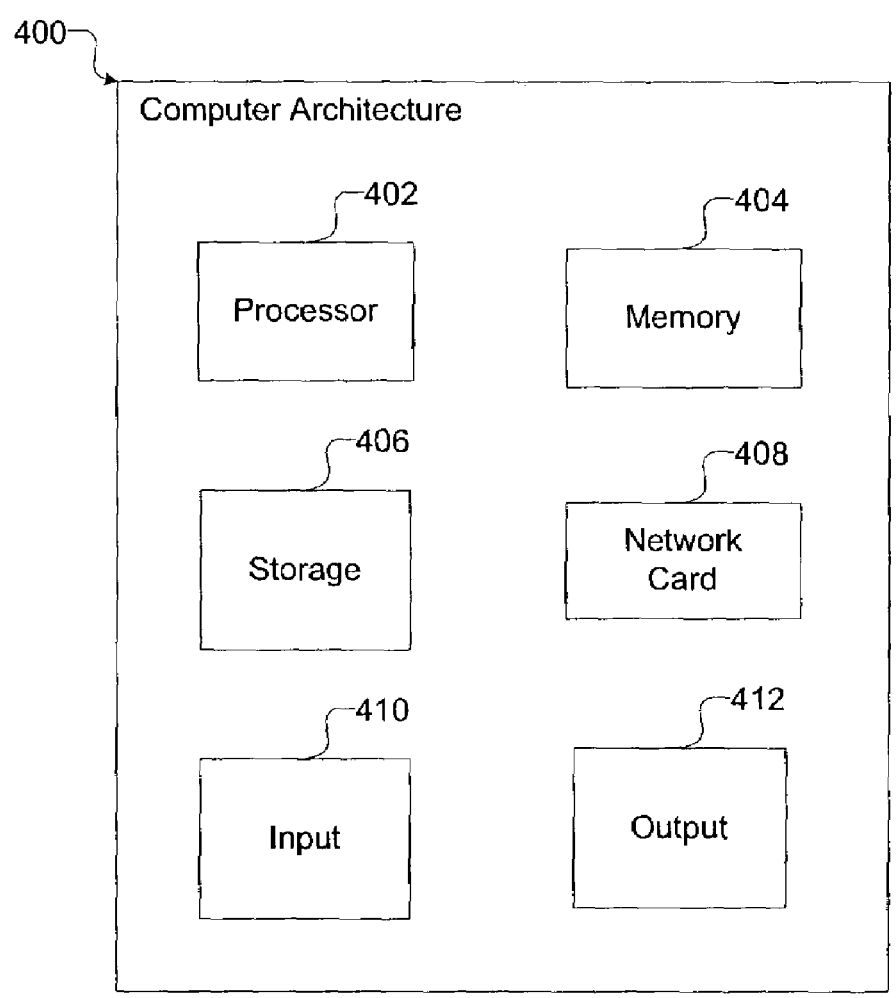
FIG. 4 illustrates a block diagram of a computer architecture in which certain described aspects of the invention are implemented.

FIG. 4 illustrates a block diagram of a computer architecture in which certain aspects of the invention are implemented. FIG. 4 illustrates one embodiment of the host system 100. The host system 100 may implement a computer architecture 400 having a processor 402 (such as the CPU 106), a memory 404 (e.g., a volatile memory device), and storage 406. The storage 406 may include non-volatile memory devices (e.g., EEPROMs, ROMs, PROMs, RAMs, DRAMs, SRAMs, flash, firmware, programmable logic, etc.), magnetic disk drives, optical disk drives, tape drives, etc. The storage 406 may comprise an internal storage device, an attached storage device or a network accessible storage device. Programs in the storage 406 may be loaded into the memory 404 and executed by the processor 402 in a manner known in the art. The architecture may further include a network card 408 to enable communication with a network, such as, network 104a, 104b). The architecture may also include at least one input 410, such as a keyboard, a touchscreen, a pen, voice-activated input, etc., and at least one output 412, such as a display device, a speaker, a printer, etc.

The logic of FIG. 3 describes specific operations occurring in a particular order. Further, the operations may be performed in parallel as well as sequentially. In alternative embodiments, certain of the logic operations may be performed in a different order, modified or removed and still implement embodiments of the present invention. Morever, steps may be added to the above described logic and still conform to the embodiments. Yet further steps may be performed by a single process or distributed processes.

Furthermore, many of the software and hardware components have been described in separate modules for purposes of illustration. Such components may be integrated into fewer number of components or divided into larger number of components. Additionally, certain operations described as performed by a specific component may be performed by other components.

The data structures and components shown or referred to in FIGS. 1–4 are described as having specific types of information. In alternative embodiments, the data structures and components may be structured differently and have fewer, more or different fields or different functions than those shown or referred to in the figures.

Therefore, the foregoing description of the embodiments has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
    determining a current system interrupt rate at a computational device, wherein the current system interrupt rate is a sum of interrupt rates from a plurality of interrupt generating agents;
    comparing the current system interrupt rate with at least one threshold interrupt rate associated with the computational device; and
    based on the comparison, adjusting an interrupt moderation level at an interrupt generating agent of the plurality of interrupt generating agents by exclusively adjusting a rate at which interrupts are generated by the interrupt generating agent.

2. The method of claim 1, wherein the adjusting of the interrupt moderation level at the interrupt generating agent of the plurality of interrupt generating agents is performed without polling the interrupt generating agent.

3. The method of claim 1, wherein the at least one threshold interrupt rate is a maximum system interrupt rate, and wherein the comparison and adjustment further comprises:
    determining whether the current system interrupt rate exceeds the maximum system interrupt rate;
    if the current system interrupt rate exceeds the maximum system interrupt rate, then determining if a current interrupt moderation level at the interrupt generating agent is below a maximum interrupt moderation level at the interrupt generating agent; and
    if the current interrupt moderation level at the interrupt generating agent is below the maximum interrupt moderation level at the interrupt generating agent, then increasing the interrupt moderation level at the interrupt generating agent.

4. The method of claim 1, wherein the at least one threshold interrupt rate is a minimum system interrupt rate, and wherein the comparison and adjustment further comprises:
    determining whether the current system interrupt rate is below a minimum system interrupt rate;
    if the current system interrupt rate is below the minimum system interrupt rate, then determining if a current interrupt moderation level at the interrupt generating agent is above a minimum interrupt moderation level at the interrupt generating agent; and
    if the current interrupt moderation level at the interrupt generating agent is above the maximum interrupt moderation level at the interrupt generating agent, then decreasing the interrupt moderation level at the interrupt generating agent.

5. The method of claim 1, wherein the determination, the adjustment and the comparison are performed by an interrupt monitoring application included in the computational device.

6. The method of claim 1, wherein the one threshold interrupt rate is a maximum system interrupt rate, and the comparison further comprises:
    comparing the current system interrupt rate with a minimum system interrupt rate.

7. The method of claim 1, further comprising:
    adjusting an interrupt moderation level of a first interrupt generating agent differently from an interrupt moderation level of a second interrupt generating agent.

8. The method of claim 1, wherein an interrupt moderation adjustment routine is coupled to the interrupt generating agent, and wherein an interrupt monitoring application requests the interrupt moderation adjustment routine to adjust the interrupt moderation level at the interrupt generating agent, wherein the interrupt monitoring application also considers load on a processor in a multiple processor system and adjusts the interrupt moderation level of the interrupt generating agent based on the affinity of the interrupt generating agent to the processor.

9. A system for adjusting interrupts from a plurality of interrupt generating agents at a computational device, comprising:
- an interrupt monitoring application coupled to the computational device, wherein the interrupt monitoring application determines a current system interrupt rate at the computational device, wherein the current system interrupt rate is a sum of interrupt rates from a plurality of interrupt generating agents;
- at least one threshold interrupt rate associated with the computational device, wherein the one threshold interrupt rate is compared with the current system interrupt rate; and
- an interrupt moderation level at an interrupt generating agent of the plurality of interrupt generating agents, wherein the interrupt moderation level is adjusted based on the comparison of the current system interrupt rate to the one threshold interrupt rate, and wherein the interrupt moderation level is adjusted by exclusively adjusting a rate at which interrupts are generated by the interrupt generating agent.

10. The system of claim 9, wherein the interrupt moderation level at the interrupt generating agent of the plurality of interrupt generating agents is adjusted without polling the interrupt generating agent.

11. The system of claim 9, further comprising:
- a maximum system interrupt rate, wherein the at least one threshold interrupt rate is the maximum system interrupt rate, and wherein the comparison and adjustment further comprises determining whether the current system interrupt rate exceeds the maximum system interrupt rate; and
- a maximum interrupt moderation level at the interrupt generating agent, wherein if the current system interrupt rate exceeds the maximum system interrupt rate then determining if a current interrupt moderation level at the interrupt generating agent is below the maximum interrupt moderation level at the interrupt generating agent, and wherein if the current interrupt moderation level at the interrupt generating agent is below the maximum interrupt moderation level at the interrupt generating agent, then increasing the interrupt moderation level at the interrupt generating agent.

12. The system of claim 9, further comprising:
- a minimum system interrupt rate, wherein the at least one threshold interrupt rate is the minimum system interrupt rate, and wherein the comparison and adjustment further comprises determining whether the current system interrupt rate is below a minimum system interrupt rate; and
- a current interrupt moderation level at the interrupt generating agent, wherein if the current system interrupt rate is below the minimum system interrupt rate, then determining if the current interrupt moderation level is above a minimum interrupt moderation level at the interrupt generating agent, and wherein if the current interrupt moderation level at the interrupt generating agent is above the maximum interrupt moderation level at the interrupt generating agent then decreasing the interrupt moderation level at the interrupt generating agent.

13. The system of claim 9, wherein the interrupt monitoring application is included in the computational device, and the adjustment and the comparison are performed by the interrupt monitoring application.

14. The system of claim 9, further comprising:
a maximum system interrupt rate, wherein the one threshold interrupt rate is the maximum system interrupt rate, and the comparison further comprises comparing the current system interrupt rate with a minimum system interrupt rate.

15. The system of claim 9, further comprising:
- an interrupt moderation level of a first interrupt generating agent; and
- an interrupt moderation level of a second interrupt generating agent, wherein the interrupt moderation level of the first interrupt generating agent is adjusted differently from the interrupt moderation level of the second interrupt generating agent.

16. The system of claim 9, wherein an interrupt moderation adjustment routine is coupled to the interrupt generating agent, and wherein the interrupt monitoring application requests the interrupt moderation adjustment routine to adjust the interrupt moderation level at the interrupt generating agent, wherein the interrupt monitoring application also considers load on a processor in a multiple processor system and adjusts the interrupt moderation level of the interrupt generating agent based on the affinity of the interrupt generating agent to the processor.

17. A system comprising:
- a computer;
- a plurality of interrupt generating agents coupled to the computer;
- an interrupt monitoring application coupled to the computer, wherein the interrupt monitoring application determines a current system interrupt rate at the computer, wherein the current system interrupt rate is a sum of interrupt rates from a plurality of interrupt generating agents;
- at least one threshold interrupt rate associated with the computer, wherein the one threshold interrupt rate is compared with the current system interrupt rate; and
- an interrupt moderation level at an interrupt generating agent of the plurality of interrupt generating agents, wherein the interrupt moderation level is adjusted based on the comparison of the current system interrupt rate to the one threshold interrupt rate, and wherein the interrupt moderation level is adjusted by exclusively adjusting a rate at which interrupts are generated by the interrupt generating agent.

18. The system of claim 17, wherein the interrupt moderation level at the interrupt generating agent of the plurality of interrupt generating agents is adjusted without polling the interrupt generating agent.

19. The system of claim 17, further comprising:
- a maximum system interrupt rate, wherein the at least one threshold interrupt rate is the maximum system interrupt rate, and wherein the comparison and adjustment further comprises determining whether the current system interrupt rate exceeds the maximum system interrupt rate; and
- a maximum interrupt moderation level at the interrupt generating agent, wherein if the current system interrupt rate exceeds the maximum system interrupt rate then determining if a current interrupt moderation level at the interrupt generating agent is below the maximum interrupt moderation level at the interrupt generating agent, and wherein if the current interrupt moderation level at the interrupt generating agent is below the maximum interrupt moderation level at the interrupt generating agent, then increasing the interrupt moderation level at the interrupt generating agent.

20. The system of claim 17, further comprising:
a minimum system interrupt rate, wherein the at least one threshold interrupt rate is the minimum system interrupt rate, and wherein the comparison and adjustment further comprises determining whether the current system interrupt rate is below a minimum system interrupt rate; and
a current interrupt moderation level at the interrupt generating agent, wherein if the current system interrupt rate is below the minimum system interrupt rate, then determining if the current interrupt moderation level is above a minimum interrupt moderation level at the interrupt generating agent, and wherein if the current interrupt moderation level at the interrupt generating agent is above the maximum interrupt moderation level at the interrupt generating agent then decreasing the interrupt moderation level at the interrupt generating agent.

21. The system of claim 17, wherein the interrupt monitoring application is included in the computer, and the adjustment and the comparison are performed by the interrupt monitoring application.

22. The system of claim 17, further comprising:
a maximum system interrupt rate, wherein the one threshold interrupt rate is the maximum system interrupt rate, and the comparison further comprises comparing the current system interrupt rate with a minimum system interrupt rate.

23. The system of claim 17, further comprising:
an interrupt moderation level of a first interrupt generating agent; and
an interrupt moderation level of a second interrupt generating agent, wherein the interrupt moderation level of the first interrupt generating agent is adjusted differently from the interrupt moderation level of the second interrupt generating agent.

24. The system of claim 17, wherein an interrupt moderation adjustment routine is coupled to the interrupt generating agent, and wherein the interrupt monitoring application requests the interrupt moderation adjustment routine to adjust the interrupt moderation level at the interrupt generating agent, wherein the interrupt monitoring application also considers load on a processor in a multiple processor system and adjusts the interrupt moderation level of the interrupt generating agent based on the affinity of the interrupt generating agent to the processor.

25. An article of manufacture, wherein the article of manufacture is capable of causing operations, the operations comprising:
determining a current system interrupt rate at a computational device, wherein the current system interrupt rate is a sum of interrupt rates from a plurality of interrupt generating agents;
comparing the current system interrupt rate with at least one threshold interrupt rate associated with the computational device; and based on the comparison, adjusting an interrupt moderation level at an interrupt generating agent of the plurality of interrupt generating agents by exclusively adjusting a rate at which interrupts are generated by the interrupt generating agent.

26. The article of manufacture of claim 25, wherein the adjusting of the interrupt moderation level at the interrupt generating agent of the plurality of interrupt generating agents is performed without polling the interrupt generating agent.

27. The article of manufacture of claim 25, wherein the at least one threshold interrupt rate is a maximum system interrupt rate, and wherein the comparison and adjustment further comprises:
determining whether the current system interrupt rate exceeds the maximum system interrupt rate;
if the current system interrupt rate exceeds the maximum system interrupt rate, then determining if a current interrupt moderation level at the interrupt generating agent is below a maximum interrupt moderation level at the interrupt generating agent; and
if the current interrupt moderation level at the interrupt generating agent is below the maximum interrupt moderation level at the interrupt generating agent, then increasing the interrupt moderation level at the interrupt generating agent.

28. The article of manufacture of claim 25, wherein the at least one threshold interrupt rate is a minimum system interrupt rate, and wherein the comparison and adjustment further comprises:
determining whether the current system interrupt rate is below a minimum system interrupt rate;
if the current system interrupt rate is below the minimum system interrupt rate, then determining if a current interrupt moderation level at the interrupt generating agent is above a minimum interrupt moderation level at the interrupt generating agent; and
if the current interrupt moderation level at the interrupt generating agent is above the maximum interrupt moderation level at the interrupt generating agent, then decreasing the interrupt moderation level at the interrupt generating agent.

29. The article of manufacture of claim 25, wherein the determination, the adjustment and the comparison are performed by an interrupt monitoring application included in the computational device.

30. The article of manufacture of claim 25, wherein the one threshold interrupt rate is a maximum system interrupt rate, and the comparison further comprises:
comparing the current system interrupt rate with a minimum system interrupt rate.

31. The article of manufacture of claim 25, further comprising:
adjusting an interrupt moderation level of a first interrupt generating agent differently from an interrupt moderation level of a second interrupt generating agent.

32. The article of manufacture of claim 25, wherein an interrupt moderation adjustment routine is coupled to the interrupt generating agent, and wherein an interrupt monitoring application requests the interrupt moderation adjustment routine to adjust the interrupt moderation level at the interrupt generating agent, wherein the interrupt monitoring application also considers load on a processor in a multiple processor system and adjusts the interrupt moderation level of the interrupt generating agent based on the affinity of the interrupt generating agent to the processor.

* * * * *